US012691922B2

(12) United States Patent
Bastien et al.

(10) Patent No.: US 12,691,922 B2
(45) Date of Patent: Jul. 28, 2026

(54) CONTROL MECHANISM FOR FOLDABLE STROLLER

(71) Applicant: MONAHAN PRODUCTS, LLC, Rockland, MA (US)

(72) Inventors: Richard M. Bastien, Cumberland, RI (US); Luis Alejandro Canas, Stoughton, MA (US)

(73) Assignee: MONAHAN PRODUCTS, LLC, Rockland, MA (US)

( * ) Notice: Subject to any disclaimer, the term of this patent is extended or adjusted under 35 U.S.C. 154(b) by 410 days.

(21) Appl. No.: 18/224,635

(22) Filed: Jul. 21, 2023

(65) Prior Publication Data

US 2025/0026395 A1      Jan. 23, 2025

(51) Int. Cl.
B62B 7/06          (2006.01)

(52) U.S. Cl.
CPC ..................................... B62B 7/06 (2013.01)

(58) Field of Classification Search
CPC ........... B62B 7/06; B62B 7/064; B62B 7/062; B62B 2205/20; F16C 11/10; F16C 7/00; F16C 7/02
See application file for complete search history.

(56) References Cited

U.S. PATENT DOCUMENTS

| | | | |
|---|---|---|---|
| 4,906,017 A | 3/1990 | Kassai | |
| 5,205,579 A | 4/1993 | Kato et al. | |
| 5,511,441 A | 4/1996 | Arai | |
| 6,068,284 A | 5/2000 | Kakuda | |
| 6,485,216 B1 | 11/2002 | Cheng | |
| 6,827,365 B2 | 12/2004 | Yeh | |
| 8,205,906 B2 * | 6/2012 | Kretschmer | ............ B62B 7/147 |
| | | | 280/47.38 |
| 8,979,114 B2 | 3/2015 | Cheng et al. | |
| 9,193,373 B2 | 11/2015 | Fjelland et al. | |
| 9,638,243 B2 | 5/2017 | Li et al. | |
| 9,718,488 B2 | 8/2017 | Singh et al. | |
| 10,106,185 B2 | 10/2018 | Plested et al. | |
| 10,322,740 B2 * | 6/2019 | Chen | ....................... B62B 7/068 |
| 11,027,761 B2 | 6/2021 | Singh et al. | |

(Continued)

FOREIGN PATENT DOCUMENTS

| | | |
|---|---|---|
| CN | 208453074 U | 2/2019 |
| CN | 113276929 A | 8/2021 |

(Continued)

OTHER PUBLICATIONS

International Search Report and Written Opinion from corresponding International Application No. PCT/US2024/038990 dated Nov. 7, 2024.

(Continued)

*Primary Examiner* — Steve Clemmons
(74) *Attorney, Agent, or Firm* — Lando & Anastasi, LLP

(57)          ABSTRACT

A stroller is provided comprising a body having an upper body portion and a lower body portion, at least one of the upper body portion and lower body portion configured to rotate with respect to the other body portion; a first articulation coupling the upper body portion and lower body portion, the first articulation configured to exert an inward force on a gear; and an assembly coupled to the first articulation and configured to control the first articulation.

19 Claims, 8 Drawing Sheets

(56)                    References Cited

U.S. PATENT DOCUMENTS

| | | |
|---|---|---|
| 11,273,856 B2 | 3/2022 | Singh et al. |
| 2006/0237949 A1 | 10/2006 | Hou et al. |
| 2012/0223508 A1 | 9/2012 | Ohnishi |
| 2014/0064829 A1 | 3/2014 | Li et al. |
| 2015/0217793 A1 | 8/2015 | Fjelland et al. |

FOREIGN PATENT DOCUMENTS

| | | | | |
|---|---|---|---|---|
| DE | 20218521 U1 | 3/2003 | | |
| EP | 1500569 B1 | 4/2006 | | |
| EP | 2011717 A1 * | 1/2009 | .............. | B62B 7/04 |
| KR | 20120030621 A | 3/2012 | | |
| NO | 335333 B1 | 11/2014 | | |

OTHER PUBLICATIONS

U.S. Appl. No. 61/898,498, filed Nov. 1, 2013.
Orbitbaby stroller G2 manual, 2009, 52 pages.
Orbitbaby, orbit stroller manual, 2009, 25 pages.

* cited by examiner

CONTROL MECHANISM FOR FOLDABLE STROLLER

BACKGROUND

Strollers and similar devices, such as prams, carriages, and the like, may be used to transport people, including infants and children. Strollers may occupy space, and it may be convenient to reduce the footprint or overall space occupied by the stroller. Some strollers may be collapsible or foldable.

SUMMARY

According to at least one aspect of the present disclosure a stroller is provided, the stroller comprising: a body having an upper body portion and a lower body portion, at least one of the upper body portion and lower body portion configured to rotate with respect to the other body portion; a first articulation coupling the upper body portion and lower body portion, the first articulation configured to exert an inward force on a gear; and an assembly coupled to the first articulation and configured to control the first articulation, the assembly including: a shroud; a user interface configured to slide along a longitudinal axis of the shroud from a first position to a second position, and configured to travel inward and outward relative to the shroud in the second position; at least one tab coupled to the user interface and configured to prevent inward and outward travel of the user interface in the first position; and a linkage mechanism coupled to the user interface and configured to selectively exert an outward force on the gear and to selectively fix a position of the upper body portion relative to the lower body portion.

In some examples, the stroller further comprises a second articulation coupling the upper body portion and lower body portion, and coupled to the assembly. In some examples, the assembly of the stroller further comprises a linkage mechanism coupled to the user interface and configured to slidably travel in an inward direction and an outward direction along a longitudinal axis of the assembly relative to a center point of the assembly. In some examples, the linkage mechanism includes: a bar linkage coupled to the user interface; and a gear linkage coupled to the bar linkage. In some examples, the bar linkage includes a first end and a second end hingedly coupled together at a contact point, and the user interface is coupled to the contact point. In some examples, operating the user interface causes the bar linkage to exert the outward force on the gear linkage, and the gear linkage to exert the outward force on the first articulation. In some examples, the first articulation further comprises: a cavity structured to house the gear; and a spring configured to bias the gear into a locked position within the cavity. In some examples, the upper body portion and lower body portion rotate with respect to one another around the first articulation.

According to at least one aspect of the present disclosure, an assembly is provided, the assembly configured to couple to an articulation of a stroller, the assembly comprising: a shroud; a user interface configured to slide along a longitudinal axis of the shroud from a first position to a second position, and to travel inward and outward relative to the shroud in the second position; a linkage mechanism coupled to the user interface and configured to shift from a first position to a second position responsive to the user interface moving inward relative to the shroud; and at least one tab coupled to the user interface and configured to prevent inward and outward travel of the user interface in the first position.

In some examples, the linkage mechanism further comprises: a bar linkage having a first end and a second end, the bar linkage being coupled to the user interface and configured to extend outward along a longitudinal axis parallel to a longitudinal axis of the shroud; a gear linkage coupled to the first end of the bar linkage and configured to travel in a same direction along the longitudinal axis parallel to the longitudinal axis of the shroud as the first end. In some examples, the gear linkage includes a plurality of teeth configured to selectively bias a portion of the articulation responsive to operating the user interface. In some examples, operating the user interface causes the user interface to exert a force on the bar linkage, and the bar linkage to exert a force on the gear linkage, and the gear linkage to exert a force on the articulation. In some examples, the articulation further comprises: a gear; a cavity configured to house the gear; and a spring configured to bias the gear into a first position. In some examples, a biasing force exerted by the spring to bias the gear into the first position is, at least in part, in a direction opposite to the force exerted by the linkage mechanism responsive to operating the user interface. In some examples, the assembly further comprises a support bar; a fastener coupled to the support bar, the linkage mechanism, and the articulation. In some examples, the linkage mechanism includes a travel configured to retain the fastener, a length of the travel corresponding to a limit on the distance the linkage mechanism can move. In some examples, the user interface is a button or switch. In some examples, the assembly further comprises a shroud configured to retain the linkage mechanism and at least a portion of the user interface. In some examples, the assembly is further coupled to a second articulation on a second end of the assembly opposite a first end of the assembly, the articulation being coupled to the first end.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Aspects and elements of this disclosure relate to a collapsible stroller body. In particular, the control and folding mechanism allows a person to manipulate the stroller body from a first position, where the stroller body is ready to carry passengers, to a second position where the stroller body is folded to be stowed.

Figure 1:
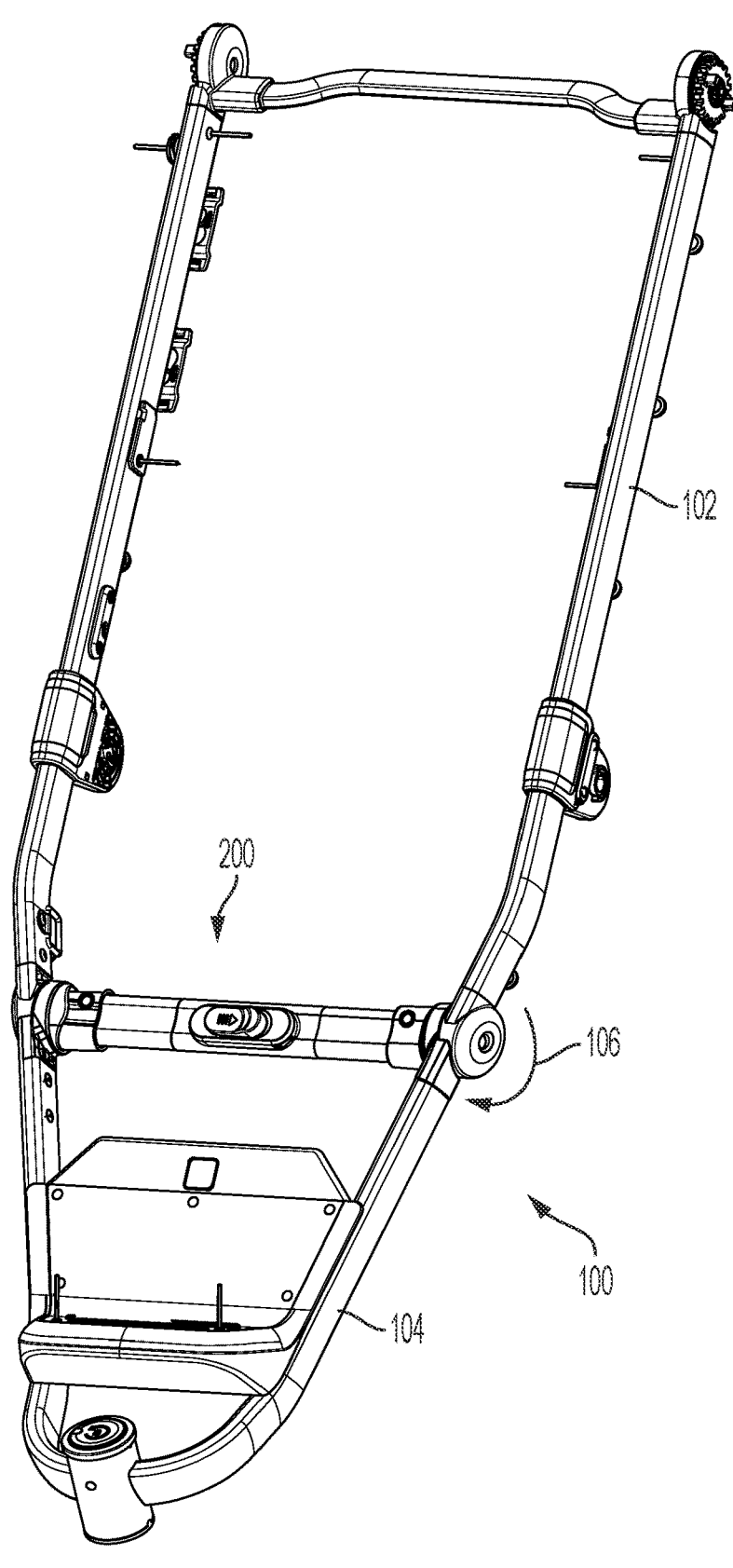
FIG. 1 illustrates a stroller body according to an example.

FIG. 1 illustrates a stroller body 100 according to an example. Stroller body 100 has an upper body portion 102, a lower body portion 104, and an assembly 200. As illustrated, stroller body 100 is in a first position. That is, stroller body 100 is configured to carry passengers and be used rather than configured to be stowed (however, one may still stow stroller body 100 even when stroller body 100 is in the first position).

Upper body portion 102 is coupled to lower body portion 104 and to assembly 200. Lower body portion 104 is coupled to upper body portion 102 and assembly 200. Assembly 200 is coupled between upper body portion 102 and lower body portion 104, and is configured to permit upper body portion 102 and lower body portion 104 to move relative to one another. In at least one example, assembly 200 allows upper body portion 102 to rotate relative to lower body portion 104 in the direction indicated by arrow 106. In some examples, the rotation of upper body portion 102 relative to lower body portion 104 is centered around an axis, such as a longitudinal axis, of assembly 200.

When upper body portion 102 and lower body portion 104 are rotated such that the two body portions are adjacent (e.g., when upper body portion 102 is rotated in the direction of arrow 106), the stroller body 100 is in the storage position. When the upper body portion 102 and lower body portion 104 are in the position shown in FIG. 1, the body portions are in the usage position. In the usage position, stroller body 100 is configured to carry passengers. In the storage position, stroller body 100 is configured to take up less space and to be stored.

Figure 2:
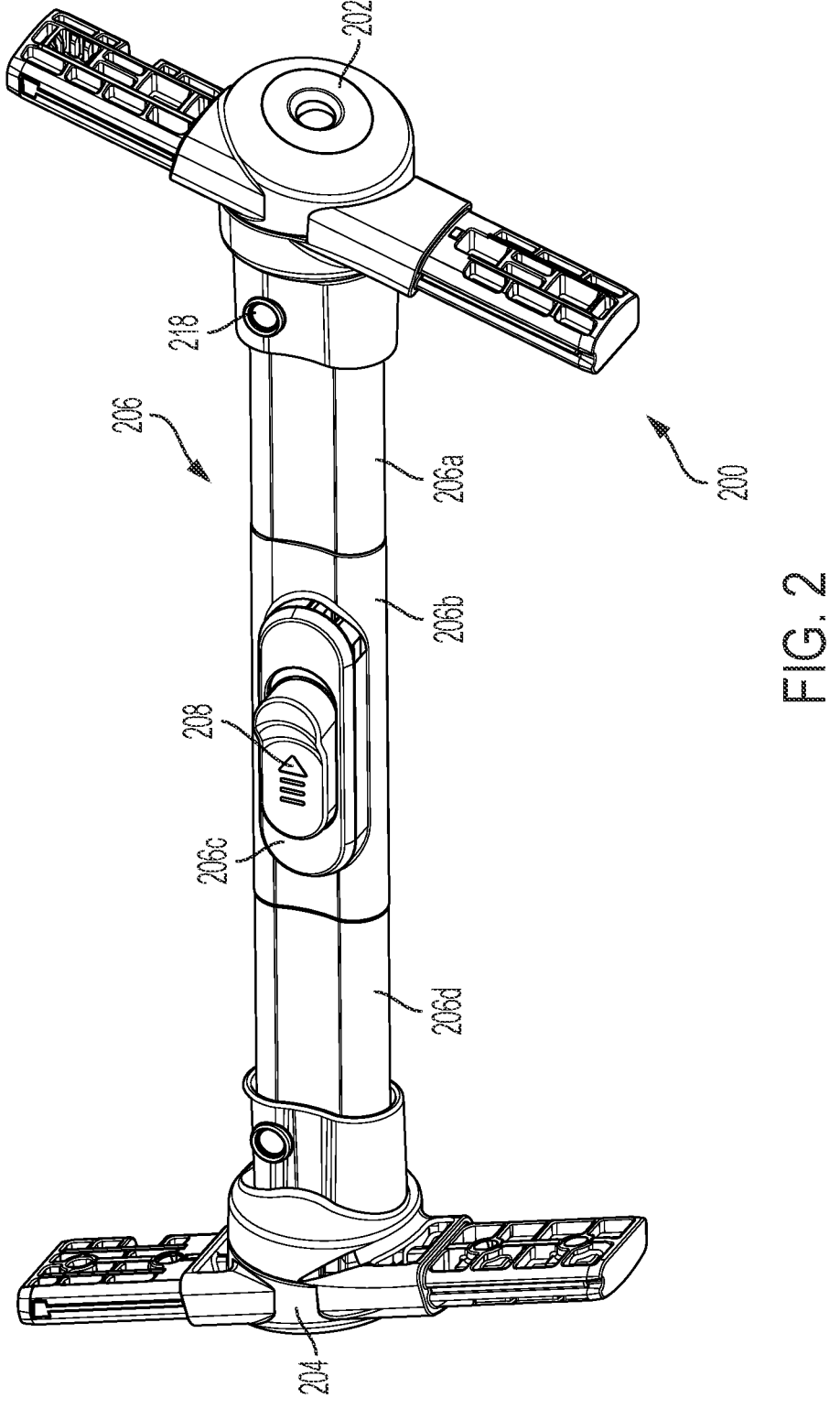
FIG. 2 illustrates an assembly according to an example.

FIG. 2 illustrates assembly 200 according to an example. Assembly 200 may be used to control the rotation of upper body portion 102 and lower body portion 104, and may contain the axis around which body portions 102, 104 rotate. In some examples, assembly 200 may be operated using a single hand or equivalent by the user whether assembly 200 is in the first position or the second position or another position. Assembly 200 includes a first articulation 202, a second articulation 204, a shroud 206, and a user interface 208.

First articulation 202 is coupled to shroud 206. Second articulation 204 is coupled to shroud 206. User interface 208 is coupled to shroud 206. Shroud 206 may be comprised of one or more than one piece. For example, as illustrated in FIG. 2, shroud 206 includes a first side piece 206a, a first center piece 206b, a second center piece 206c, and a second side piece 206d. First side piece 206a couples, via fastener 218, to a portion of first articulation 202 (see FIG. 6 for a discussion of the exterior components of first articulation 202). Second side piece 206d couples to second articulation 204, also via a fastener. First center piece 206b is coupled between and to both first side piece 206a and second side piece 206d. First center piece 206b is also coupled to second center piece 206c. Second center piece 206c movably houses user interface 208. In some examples, spring 209 (discussed with respect to FIGS. 3A-3C) may be coupled to second center piece 206c.

Shroud 206 can cover internal mechanisms that link user interface 208 to one or more of first articulation 202 and second articulation 204.

User interface 208 may be a button, a switch, a slider, or any other operable mechanism, and may be configured to be slid, pressed, or otherwise manipulated from one position to another position as a means of operating the assembly 200. User interface 208 may be linked to articulations 202, 204 directly or indirectly, and may control and/or restrict the behavior of articulations 202, 204, including—in some examples—an amount of rotation of upper body portion 102 permitted relative to lower body portion 104.

At least one of articulations 202, 204 may contain a mechanism that permits and/or restricts the rotation of upper body portion 102 relative to lower body portion 104. Examples of mechanisms that permit and/or restrict rotation are described with respect to FIG. 4.

Figure 3A:
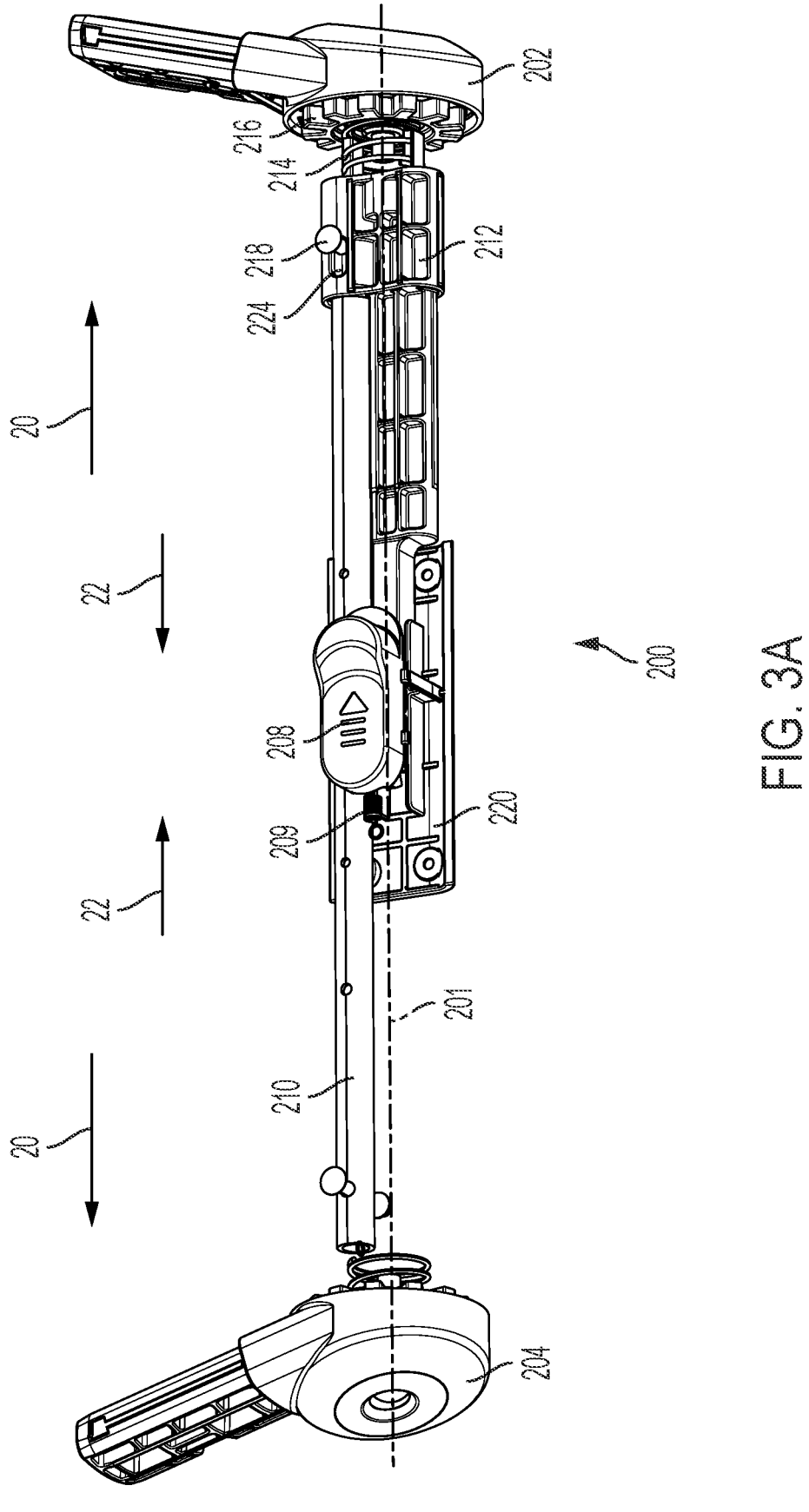
FIG. 3A illustrates an assembly according to an example.
Figure 3B:
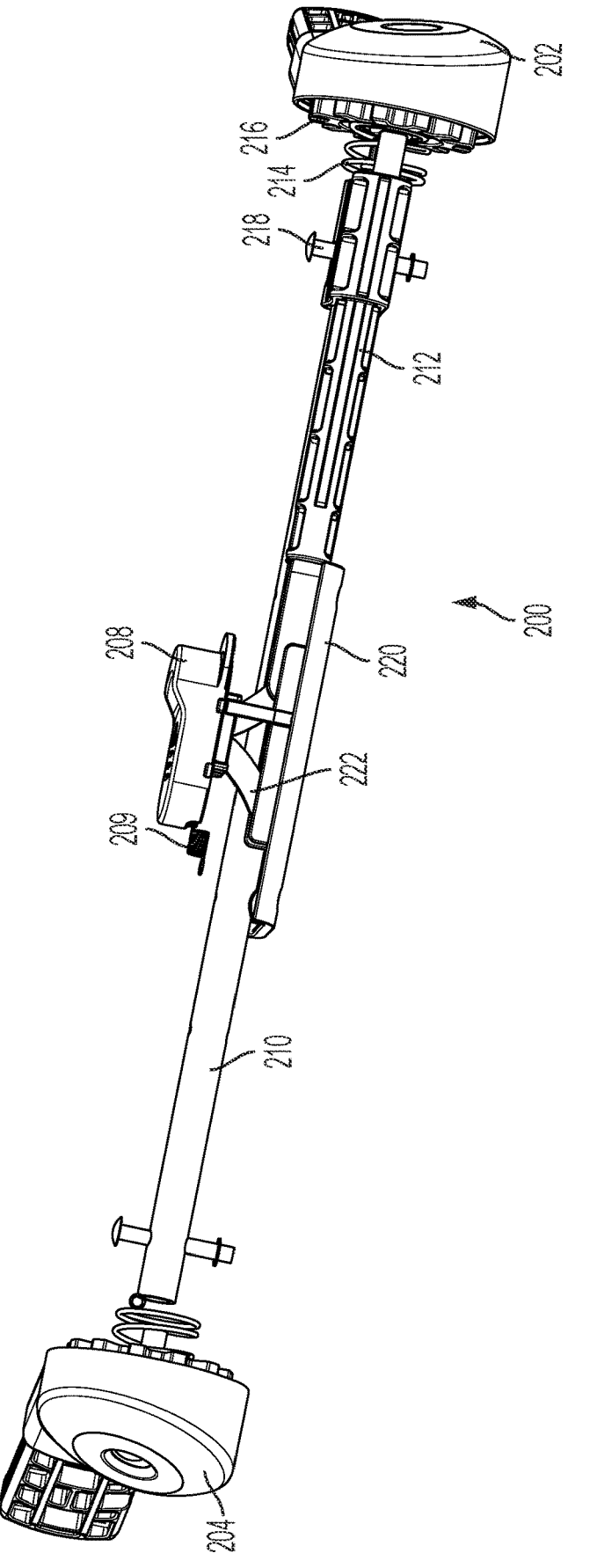
FIG. 3B illustrates an assembly according to an example.

FIG. 3A illustrates an internal view of assembly 200 from a top-down perspective according to an example. FIG. 3A shows a support bar 210, a gear linkage 212, a spring 214, a gear 216, at least one fastener 218, and a backplate 220. FIG. 3B illustrates the internal view of assembly 200 from a side-view perspective according to an example. FIG. 3B shows a bar linkage 222 in addition to the elements of FIG. 3A. FIG. 3A also shows outward arrows 20 and inward arrows 22. Outward arrows 20 indicate the outward direction with respect to button 208 and the longitudinal axis of support bar 210. Inward arrows 22 indicate the inward direction with respect to button 208 and the longitudinal axis of support bar 210.

Support bar 210 is coupled to shroud 206 (not shown), gear linkage 212, fastener 218, and, in some examples, backplate 220. User interface 208 is coupled to bar linkage 222. Bar linkage 222 is coupled to backplate 220 and gear linkage 212. Gear linkage 212 contacts spring 214 and gear 216. Gear 216 is nested within first articulation 202.

First articulation 202 is configured to retain gear 216 in a locked position and an unlocked position. In the locked position, gear 216 sits within the first articulation 202 in a cavity (which will be discussed with respect to FIG. 4). In the unlocked position, gear 216 remains within the cavity but shifts position relative to the locked position, such that gear 216 no longer obstructs the rotation of first body portion 102 and second body portion 104 with respect to one another.

Gear linkage 212 is configured to slide a distance determined by travel 224. Travel 224 may be an opening (such as a hole) in gear linkage 212 configured to accommodate fastener 218. Travel 224 may be a given length in the direction of the longitudinal axis of support bar 210, such that when force is applied in a direction parallel to the longitudinal axis of support bar 210, gear linkage 212 moves in the direction of the force until fastener 218 contacts an edge or side of travel 224, at which point a counter-force caused by fastener 218 contacting an edge or side of travel 224 prevents further motion of gear assembly 212. When an outward directed force is applied to gear linkage 212, gear linkage 212 can travel in the outward direction to the extent permitted by travel 224 and fastener 218. As gear linkage 212 moves outward, gear linkage 212 can transmit the outward force to the gear 216, thus controlling the position of the gear 216. When the gear 216 is displaced, the upper body portion 102 and lower body portion 104 may rotate or pivot with respect to one another.

Gear linkage 212 applies a force to gear 216 that can cause gear 216 to shift position from locked position to unlocked position. Gear linkage 212 has two teeth (to be discussed in greater detail with respect to FIG. 5) that protrude toward gear 216 and that contact gear 216 when gear linkage 212 shifts gear 216 from the locked to unlocked positions.

In some examples, gear linkage 212 will be biased, by an inward force (in the direction of the inward arrows 22)

exerted by spring 214 through gear 216, such that fastener 218 will be located in the outward-most portion of travel 224. In said examples, when a user applies force to user interface 208, which in turn exerts force through bar linkage 222 (shown in FIG. 3B), said force pushing bar linkage 222 in an outward direction (in the direction of outward arrows 20, that is, in the direction of gear 216 and in opposite to the force exerted by spring 214), gear linkage 212 may slide such that an innermost portion of travel 224 comes into contact with fastener 218.

A line 201 illustrates a pivot axis around which the upper body portion 102 and lower body portion 104 may pivot in some examples. The line 201 does not necessarily pass through any part of the support bar 210. In some examples, the line 201 is not a longitudinal axis of the support bar 210.

User interface 208 may be coupled to biasing spring 209. Biasing spring 209 may be coupled to shroud 206, and may configured to bias user interface 208 into a first position. In some examples, while in the first position, user interface 208 cannot be pressed down, and thus cannot exert force on bar linkage 222. Instead, in such examples, user interface 208 can be slid from the first position to a second position and then pressed down (that is, pressed in the direction of backplate 220), thus exerting force on bar linkage 222.

In various examples, user interface 208 has one or more tabs protruding from it. At least one of the one or more tabs may, in the first position, abut against a blocking portion of shroud 206 (e.g., a blocking portion of second center piece 206c) preventing user interface 208 from being pressed down. However, by sliding user interface 208 forward, the at least one of the one or more tabs may be moved into a position where it no longer abuts against the blocking portion of shroud 206 and can be pressed downward.

FIG. 3B illustrates the assembly 200 from an internal side-view according to an example. Now visible, a bar linkage 222 is shown coupled between the user interface 208 and the backplate 220. The bar linkage 222 connects the user interface 208 to the gear linkage 212. When the user interface 208 is manipulated (for example, by pressing it down toward the backplate 220 or moving the user interface 208 in an inward or outward direction relative to its present location), the position of at least part of the bar linkage 222 changes.

Figure 3C:
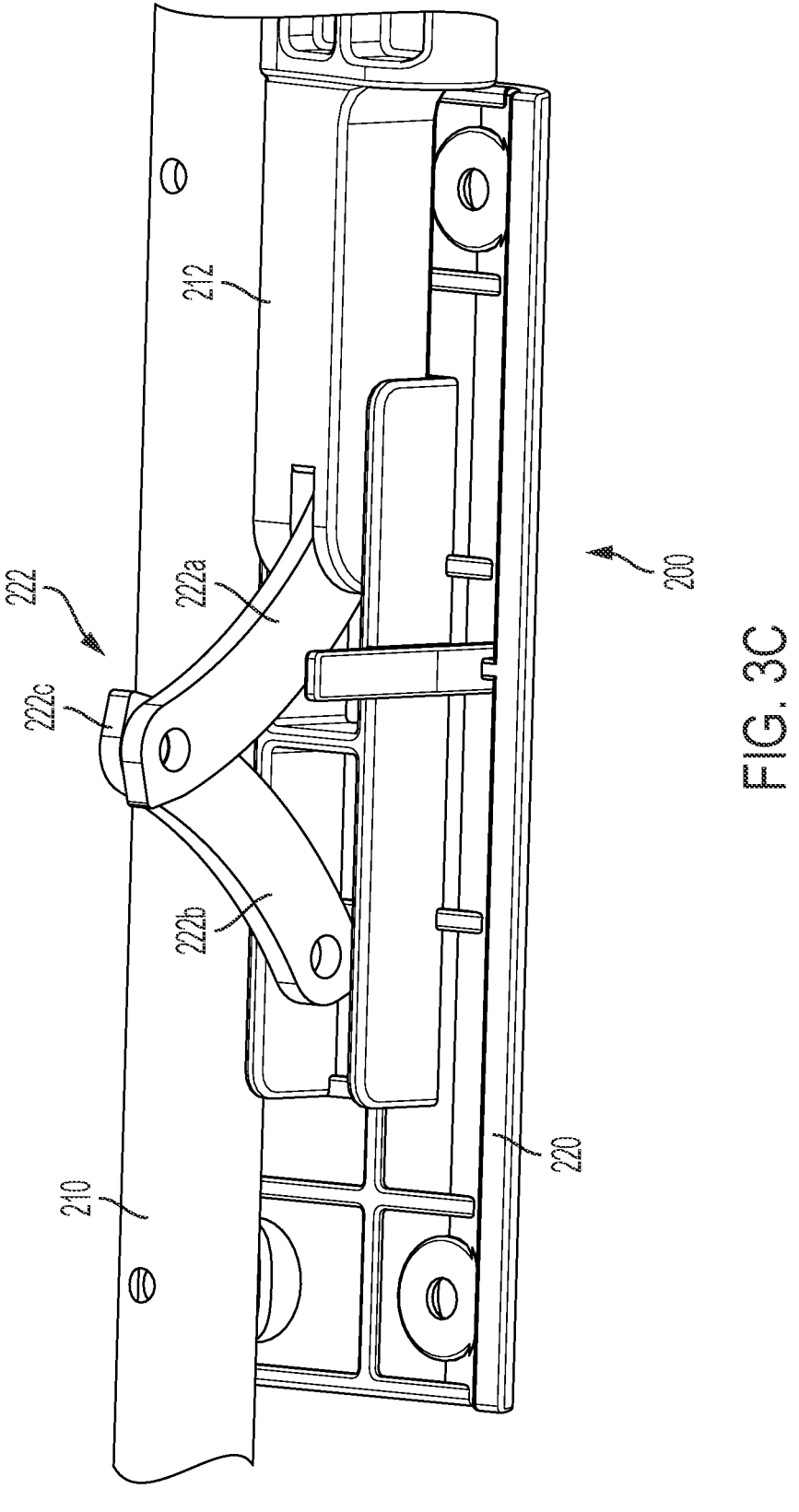
FIG. 3C illustrates a portion of an assembly according to an example.

FIG. 3C illustrates a portion of the assembly 200 including the bar linkage 222, backplate 220, gear linkage 212, and support bar 210. The bar linkage 222 has a first end 222a, a second end 222b, and a contact point 222c where bar linkage 222 contacts user interface 208. When user interface 208 is slid into the unlocked position and pressed downward, user interface 208 exerts a force on contact point 222c of bar linkage 222. Because bar linkage 222 may comprise two portions including a first portion associated with the first end 222a and a second portion associated with the second end 222b (the two portions linked at the contact point 222c), the force may cause first end 222a to move in an outward direction toward gear 216. The force may also cause second end 222b to move in an outward direction opposite the direction of movement of first end 222a. As first end 222a moves outward, first end 222a exerts an outward force on gear linkage 212. The outward force is transmitted by gear linkage 212 to gear 216. In examples where assembly 200 is arranged symmetrically, such that a second gear linkage, gear, and so forth, mirror the components shown in the figures, second end 222b may exert outward force on a respective gear linkage and the respective gear linkage may transmit the outward force to a respective gear. While assembly 200 can be symmetrically arranged, only a single gear linkage and/or gear is required to operate the assembly 200 and maintain the position of the upper and lower body portions 102, 104.

Figure 4:
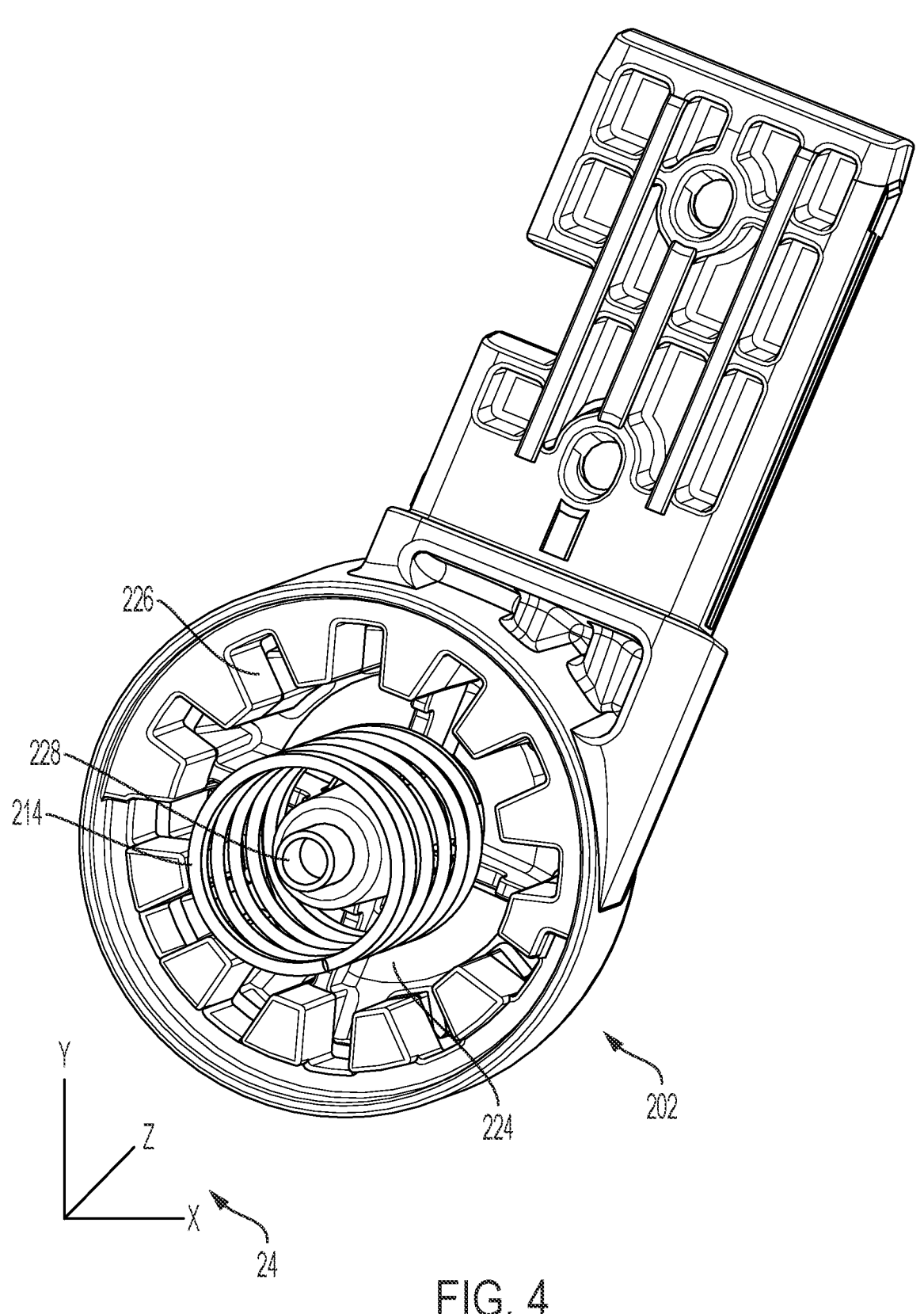
FIG. 4 illustrates an articulation according to an example.

FIG. 4 illustrates first articulation 202 according to an example. First articulation 202 may be identical to second articulation 204 in some examples. Gear 214 is not shown. Instead, the cavity 226 in which gear 216 and spring 214 sit is shown, with spring 214 present. Cavity 226 includes a pylon 228 configured to mate with gear 216 and support gear 216. Spring 214 may also be configured to sit around pylon 228. Spring 214 may, in some examples, be located near the base of pylon 228 (that is, the direction opposite from the point-of-view of FIG. 4 in the Z-direction of the axes 24). Spring 214 may thus exert force on gear 216 biasing gear 216 in the inward direction 22 of FIG. 3A. In such examples, gear linkage 212 may exert force on gear 216 in the outward direction 20, thus compressing spring 214.

Figure 5:
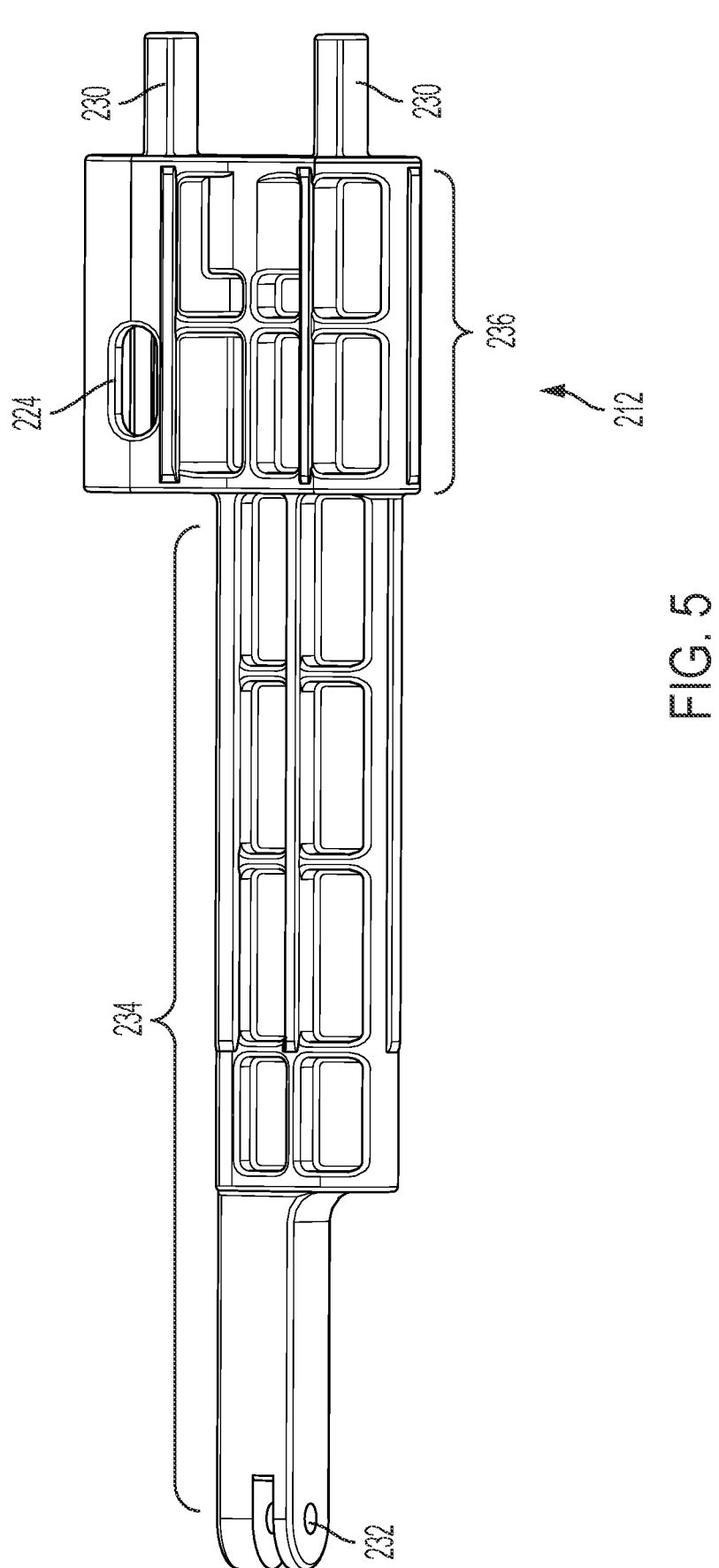
FIG. 5 illustrates a gear linkage according to an example.

FIG. 5 illustrates gear linkage 212 according to an example. Gear linkage 212 has a plurality of teeth 230 at a first end and a connector 232 at a second end. Teeth 230 protrude from gear linkage 212 and are configured to contact gear 216. At the opposite end from the first end (that is, at the second end), a connector 232 allows gear linkage 212 to connect to bar linkage 222. For example, connector 232 may have one or more holes sized the same or approximately the same as corresponding holes in gear linkage 212, which may allow connector 232 and gear linkage 212 to be coupled together. Alternatively, any type of fastener (screw, nail, pin, bolt, and so on) may be used, and other types of accommodation for fasteners may be used.

The gear linkage 212 has a head 236 and a body 234. In some examples, body 234 can be longer in at least one dimension than any dimension of head 236. Connector 232 may be part of or coupled to body 234. Head 236 may include teeth 230 and/or travel 224. In some examples, teeth 230 may be coupled to head 236.

Figure 6:
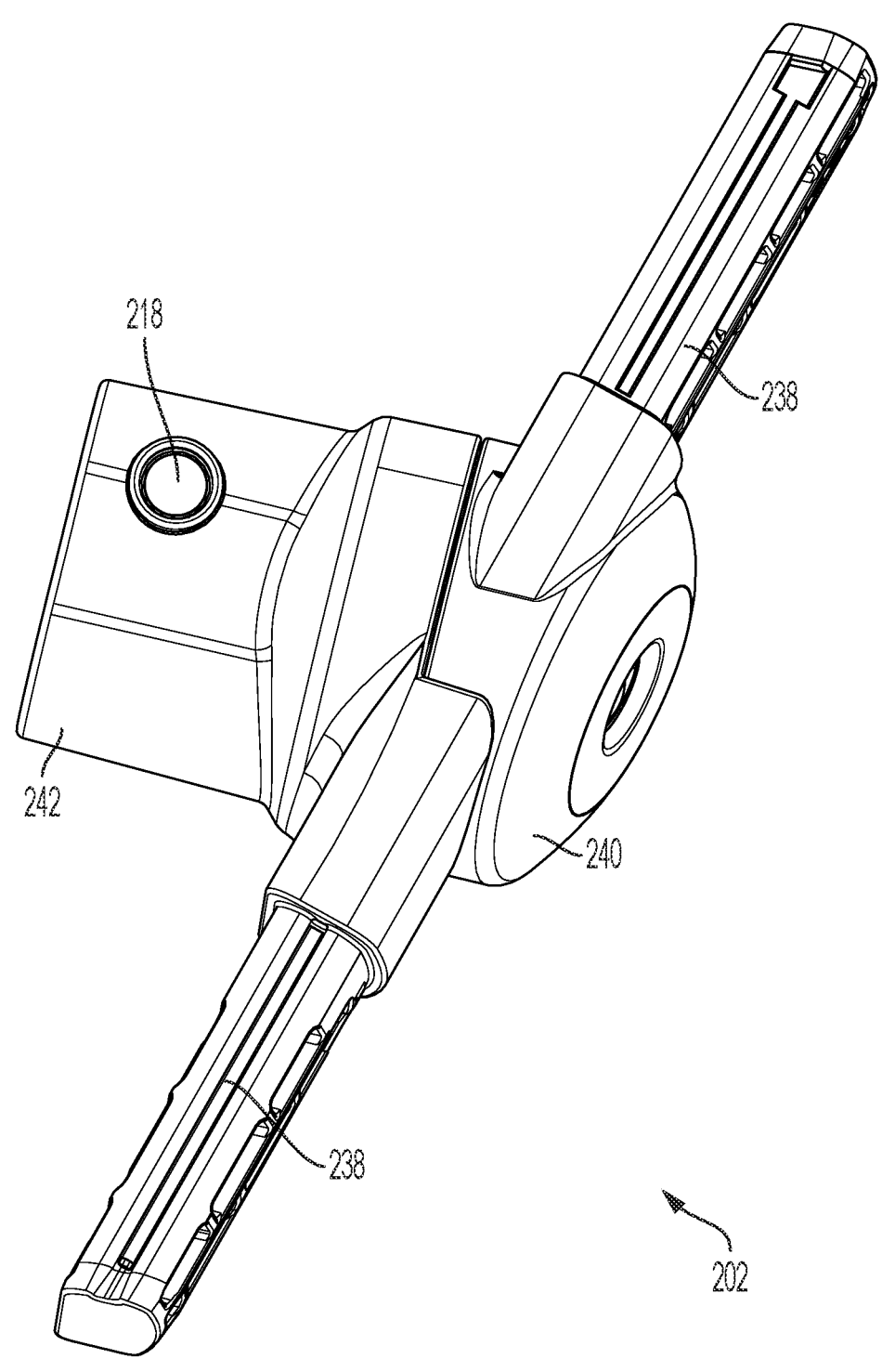
FIG. 6 illustrates an articulation according to an example.

FIG. 6 illustrates first articulation 202 according to an example. First articulation 202 may be identical to second articulation 204 and/or may be a mirror image of second articulation 204.

First articulation 202 includes a plurality of arms 238 coupled to a first shell portion 240, and a second shell portion 242 also coupled to first shell portion 240.

Plurality of arms 238 may be configured to allow first articulation 202 to couple to upper body portion 102 and lower body portion 104. For example, one arm of plurality of arms 238 may couple to upper body portion 102 and another arm of plurality of arms 238 may couple to lower body portion 104. In some examples, the arm of plurality of arms 238 that couples to upper body portion 102 may be coupled to first shell portion 240, and—in some examples—that arm may be pivotable coupled to first shell portion 240. In some examples, the arm of plurality of arms 238 that couples to lower body portion 104 may be coupled to second shell portion 242, and—in some examples—that arm may be rigidly coupled to second shell portion 242.

First shell portion 240 may include some or all of cavity 226. Second shell portion 242 may include some or all of cavity 226 and may include a hole to accommodate a portion of fastener 218, thus coupling second shell portion 242 to at least gear linkage 212 as well as to support bar 210. Gear linkage 212 may move relative to both support bar 210 and shell portions 240, 242 in the outward and inward directions 20, 22.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A stroller comprising:
a body having an upper body portion and a lower body portion, at least one of the upper body portion and lower body portion configured to rotate with respect to the other body portion;
a first articulation coupling the upper body portion and lower body portion, the first articulation configured to exert an inward force on a gear; and
an assembly coupled to the first articulation and configured to control the first articulation, the assembly including:
a shroud;
a user interface configured to slide along a longitudinal axis of the shroud from a first position to a second position, and configured to travel inward and outward relative to the shroud in the second position;
at least one tab coupled to the user interface and configured to prevent inward and outward travel of the user interface in the first position; and
a linkage mechanism coupled to the user interface and configured to selectively exert an outward force on the gear and to selectively fix a position of the upper body portion relative to the lower body portion, the linkage mechanism including a bar linkage coupled to the user interface, the bar linkage including a first end and a second end hingedly coupled together at a contact point, the user interface being coupled to the contact point as well.

2. The stroller of claim 1 further comprising:
a second articulation coupling the upper body portion and lower body portion, and coupled to the assembly.

3. The stroller of claim 1 wherein the assembly further comprises:
a second linkage mechanism coupled to the user interface and configured to slidably travel in an inward direction and an outward direction along a longitudinal axis of the assembly relative to a center point of the assembly.

4. The stroller of claim 3 wherein the linkage mechanism includes:
a gear linkage coupled to the bar linkage.

5. The stroller of claim 4 wherein operating the user interface causes the bar linkage to exert the outward force on the gear linkage, and the gear linkage to exert the outward force on the first articulation.

6. The stroller of claim 1 wherein the first articulation further comprises:
a cavity structured to house the gear; and
a spring configured to bias the gear into a locked position within the cavity.

7. The stroller of claim 1 wherein the upper body portion and lower body portion rotate with respect to one another around the first articulation.

8. The assembly of claim 1 wherein the shroud is configured to retain the linkage mechanism and at least a portion of the user interface.

9. An assembly configured to couple to an articulation of a stroller, the assembly comprising:
a shroud;
a user interface configured to slide along a longitudinal axis of the shroud from a first position to a second position, and to travel inward and outward relative to the shroud in the second position;
a linkage mechanism coupled to the user interface and configured to shift from a first position to a second position responsive to the user interface moving inward relative to the shroud, the linkage mechanism including a bar linkage, the bar linkage having a first portion and a second portion, the first portion and the second portion both being curved; and
at least one tab coupled to the user interface and configured to prevent inward and outward travel of the user interface in the first position.

10. The assembly of claim 9 wherein the linkage mechanism further comprises:
a bar linkage having a first end and a second end, the bar linkage being coupled to the user interface and configured to extend outward along a longitudinal axis parallel to a longitudinal axis of the shroud;
a gear linkage coupled to the first end of the bar linkage and configured to travel in a same direction along the longitudinal axis parallel to the longitudinal axis of the shroud as the first end.

11. The assembly of claim 10 wherein the gear linkage includes a plurality of teeth configured to selectively bias a portion of the articulation responsive to operating the user interface.

12. The assembly of claim 11 wherein operating the user interface causes the user interface to exert a force on the bar linkage, and the bar linkage to exert a force on the gear linkage, and the gear linkage to exert a force on the articulation.

13. The assembly of claim 9 wherein the articulation further comprises:

a gear;

a cavity configured to house the gear; and a spring configured to bias the gear into a first position.

14. The assembly of claim 13 wherein a biasing force exerted by the spring to bias the gear into the first position is, at least in part, in a direction opposite to the force exerted by the linkage mechanism responsive to operating the user interface.

15. The assembly of claim 9 wherein the user interface is a button or switch.

16. The assembly of claim 9 wherein the shroud is further configured to retain the linkage mechanism and at least a portion of the user interface.

17. The assembly of claim 9 wherein the assembly is further coupled to a second articulation on a second end of the assembly opposite a first end of the assembly, the articulation being coupled to the first end.

18. An assembly configured to couple to an articulation of a stroller, the assembly comprising:

a shroud;

a user interface configured to slide along a longitudinal axis of the shroud from a first position to a second position, and to travel inward and outward relative to the shroud in the second position;

a linkage mechanism coupled to the user interface and configured to shift from a first position to a second position responsive to the user interface moving inward relative to the shroud;

at least one tab coupled to the user interface and configured to prevent inward and outward travel of the user interface in the first position;

a support bar; and a fastener coupled to the support bar, the linkage mechanism, and the articulation.

19. An assembly configured to couple to an articulation of a stroller, the assembly comprising:

a shroud;

a user interface configured to slide along a longitudinal axis of the shroud from a first position to a second position, and to travel inward and outward relative to the shroud in the second position;

a linkage mechanism coupled to the user interface and configured to shift from a first position to a second position responsive to the user interface moving inward relative to the shroud; and at least one tab coupled to the user interface and configured to prevent inward and outward travel of the user interface in the first position, wherein the linkage mechanism includes a travel configured to retain the fastener, a length of the travel corresponding to a limit on the distance the linkage mechanism can move.

* * * * *